US012428267B2

(12) United States Patent
Weber et al.

(10) Patent No.: US 12,428,267 B2
(45) Date of Patent: Sep. 30, 2025

(54) CAR ARRANGEMENT AND METHOD FOR MOUNTING A SPINDLE DRIVE IN A CAR ARRANGEMENT FOR A DOUBLE-DECKER ELEVATOR

(71) Applicant: Inventio AG, Hergiswil (CH)

(72) Inventors: Stefan Weber, Niederwil (CH); Dragan Gavric, Brunnen (CH); Roger Beck, Sursee (CH)

( * ) Notice: Subject to any disclaimer, the term of this patent is extended or adjusted under 35 U.S.C. 154(b) by 0 days.

(21) Appl. No.: 18/716,978

(22) PCT Filed: Nov. 24, 2022

(86) PCT No.: PCT/EP2022/083098

§ 371 (c)(1),
(2) Date: Jun. 6, 2024

(87) PCT Pub. No.: WO2023/110352

PCT Pub. Date: Jun. 22, 2023

(65) Prior Publication Data

US 2025/0033932 A1 Jan. 30, 2025

(30) Foreign Application Priority Data

Dec. 15, 2021 (EP) .................................... 21214587

(51) Int. Cl.
*B66B 11/02* (2006.01)
*B66B 9/00* (2006.01)
(Continued)

(52) U.S. Cl.
CPC .............. *B66B 11/022* (2013.01); *B66B 9/00* (2013.01); *B66B 11/005* (2013.01); *B66B 11/0273* (2013.01); *B66B 19/00* (2013.01)

(58) Field of Classification Search
CPC ............. B66B 11/022; B66B 2201/306; B66B 11/0213; B66B 2009/006; B66B 2201/308
See application file for complete search history.

(56) References Cited

U.S. PATENT DOCUMENTS 5,907,136 A * 5/1999 Hongo ................ B66B 11/0095 187/277
7,017,714 B2 3/2006 Fujita et al.
(Continued)

FOREIGN PATENT DOCUMENTS

CN 1276336 A * 12/2000 .............. B66B 1/42
EP 1074503 B1 7/2008
(Continued)

*Primary Examiner* — Diem M Tran
(74) *Attorney, Agent, or Firm* — Schlee IP International, PC; Alexander R. Schlee; Pascal A. Schlee

(57) ABSTRACT

A car arrangement includes: a first car and a second car arranged one above the other in a car frame; wherein at least the first car is displaceable along the car frame in the direction of a vertical axis by a spindle drive; wherein the spindle drive includes a spindle and a drive unit; wherein the spindle drive is guided through a cutout in a support structure of the car frame, and the drive unit has a housing with a fastening flange fastening the housing to the support structure; and wherein the housing has first and second positions in relation to the cutout, the fastening flange exposing the cutout in the first position so the spindle drive can be guided through the cutout in the direction of the vertical axis, and the fastening flange projects beyond an outer edge of the cutout in the second position.

14 Claims, 3 Drawing Sheets

3 FIRST CAR 4 SECOND CAR 10 DRIVE UNIT 11 HOUSING

(51) Int. Cl.
*B66B 11/00* (2006.01)
*B66B 19/00* (2006.01)

(56) References Cited

U.S. PATENT DOCUMENTS 9,102,502 B2 * 8/2015 Yamada ................ B66B 11/022
9,783,391 B2 * 10/2017 Zerelles ................ B66B 11/022

FOREIGN PATENT DOCUMENTS

JP H07315773 A 12/1995
JP 5679602 B1 * 3/2015 ............... B66B 1/36

* cited by examiner

3 FIRST CAR 4 SECOND CAR 10 DRIVE UNIT 11 HOUSING

10 DRIVE UNIT 11 HOUSING

CAR ARRANGEMENT AND METHOD FOR MOUNTING A SPINDLE DRIVE IN A CAR ARRANGEMENT FOR A DOUBLE-DECKER ELEVATOR

FIELD

The present invention relates to a car arrangement for a double-decker elevator. Furthermore, the invention relates to a double-decker elevator comprising such a car arrangement and to a method for mounting a spindle drive in such a double-decker elevator.

BACKGROUND

In addition to single-cabin or single-car elevators, so-called double-decker or double-deck elevators can be used to transport people and/or objects between floors of a building. A double-decker elevator is basically characterized by a car frame in which two cars or elevator cabins are arranged one above the other. By moving the car frame with the cars arranged in it, the cars can be moved together and thus stop simultaneously at two floors located one above the other.

As floor heights can vary within a building, double-decker elevators are often equipped with an adjustment mechanism that allows the vertical distance between the two cars to be adapted accordingly, for example automatically during the journey to the next stop.

The adjustment mechanism can, for example, comprise one or more electric spindle drives. For maintenance and servicing purposes, such a spindle drive should be easily accessible and (dis) mountable in the elevator shaft even after the double-decker elevator has been installed.

EP 1 074 503 B1 shows an example of a double-decker elevator with two spindle drives for vertical adjustment of two cars within a car frame. Each spindle drive comprises a drive motor that is placed onto the car frame from above.

SUMMARY

There may therefore be a need for a car arrangement for a double-decker elevator that enables particularly easy (dis) mounting of a spindle drive.

In addition, there may be a need for a double-decker elevator that is easy to maintain and/or service.

Last but not least, there may be a need for a method that allows simple (dis) mounting of a spindle drive in a car arrangement for a double-decker elevator.

These needs can be met by the subject matter of the advantageous embodiments defined in the following description, as well as the accompanying drawings.

A first aspect of the invention relates to an elevator car arrangement for a double-deck elevator. The car arrangement comprises a first car, a second car and a car frame, which is arranged in an elevator shaft of the double-decker elevator so that it can be displaced in the longitudinal direction of the elevator shaft. The first car and the second car are arranged one above the other in the car frame in an operational state of the double-decker elevator. At least the first car can be displaced along the car frame in the direction of a vertical axis by means of a spindle drive. The spindle drive comprises a spindle, which is mechanically coupled to the first car, and a drive unit for driving the spindle. The spindle drive is guided through a cutout in a support structure of the car frame. The drive unit has a housing with a fastening flange via which the housing is fastened to the support structure. The housing can be positioned in a first position and a second position in relation to the cutout. The fastening flange exposes the cutout in the first position, so that the spindle drive can be guided through the cutout in the direction of the vertical axis, and projects beyond an outer edge of the cutout in the second position.

The car frame can be understood as a frame-like structure consisting of a plurality of supports and/or support structures. For example, in the operational state of the double-decker elevator, the car frame can be guided via guide shoes and/or rollers on at least one vertically running guide rail anchored in the elevator shaft.

In the simplest case, the car frame can, for example, be constructed from two (horizontal) cross members and two (vertical) longitudinal members, which are connected via the cross members to form a frame. The cars can be arranged one above the other within this frame. For example, each longitudinal member can be guided on a guide rail.

As mentioned at the beginning, the first and the second car can be moved together in the elevator shaft by moving the car frame along the guide rail(s) and thus stop simultaneously at two floors located one above the other.

By means of the spindle drive, it is possible to adjust a vertical distance between the first and the second car, for example to adapt the vertical distance to varying floor heights within a building.

Additionally or alternatively, the spindle drive can be designed to displace the first car along the car frame in the direction of the vertical axis in the opposite direction to the second car, i.e. the two cars move toward or away from each other at the same time.

The drive unit can, for example, comprise an electric drive motor and a gearbox that couples a drive shaft of the drive motor to the spindle. Accordingly, the drive motor and the gearbox can be accommodated by the housing. The drive unit can also be designed without a gearbox so that the drive motor is coupled directly to the spindle. The spindle drive can therefore be designed as a so-called direct spindle drive.

The spindle can be rotatably mounted in a spindle nut, wherein the spindle nut can be fastened to the first car in a suitable manner. Depending on the direction of rotation, rotating the spindle causes a vertical distance between the drive unit and the spindle nut, i.e. between the support structure and the first car, to be shortened or lengthened.

The first and the second position of the housing can be different angular positions relative to a longitudinal axis of the housing. In other words, the housing can be rotatable about its longitudinal axis between the first and the second position relative to the cutout together with the fastening flange.

A fastening flange can be understood as a plate-like or disk-like projection that protrudes from a housing body of the housing. The fastening flange can protrude from the housing body, particularly on mutually opposite sides. This allows a stable fastening of the housing to the support structure. The fastening flange can be arranged between two ends of the housing body. Alternatively, the fastening flange can terminate flush with one of the ends of the housing body, i.e. be part of an end face of the housing body. The fastening flange can completely or partially surround the housing body in its circumferential direction.

In the simplest case, the support structure can be a cross member of the car frame. A support structure in the form of a combination of two or more than two supports is also possible. For example, an x-shaped support structure consisting of a cross member and an additional support fastened to it and oriented at an angle to it, which additional support can have the cutout for accommodating the spindle drive or two cutouts for accommodating one spindle drive each (see below), is conceivable. The cross member can, for example, firmly connect two longitudinal members of the car frame to each other.

A cutout can be understood as a continuous opening in the support structure that connects an upper side to a lower side of the support structure.

To save space, it is expedient for the drive unit and the spindle to have a common longitudinal axis, i.e. to be arranged coaxially relative to a longitudinal axis of the spindle drive. In this case, the spindle drive in the operational state of the double-decker elevator can, for example, be oriented in the car frame in such a way that the spindle extends upward from the drive unit in a direction parallel to the vertical axis, i.e. the spindle can be mounted upright. Depending on the type of elevator, however, other configurations of the spindle drive are also conceivable, such as a configuration in which the spindle is mounted in a suspended manner.

The drive unit can be suspended from the support structure, for example in such a way that the drive unit partially projects into the cutout and partially-on one or both sides-projects beyond the cutout. However, it would also be conceivable to mount the drive unit upright.

The cutout with the housing or fastening flange, which can be rotated relative to it, can be understood as a kind of bayonet lock, which allows a positive connection between the support structure and the spindle drive that can be quickly established and released. This in turn makes it easy to insert the spindle drive into or remove it from the support structure without having to dismount other components of the car arrangement or the double-decker elevator, such as cars, support means or a yoke. This means that the spindle drive can be maintained and/or serviced with little effort despite the rather confined space in the elevator shaft.

A second aspect of the invention relates to a double-decker elevator. The double-decker elevator comprises an elevator shaft and at least one car arrangement as described above and below, wherein the car frame of the car arrangement(s) is arranged in the elevator shaft so as to be displaceable in the longitudinal direction thereof. Such a double-decker elevator is particularly easy to maintain and/or service thanks to the simplified (dis) mounting of the spindle drive.

A third aspect of the invention relates to a method for mounting a spindle drive in a car arrangement as described above and below. The method comprises at least the following steps, which may be carried out, for example, in the order indicated below: (i) arranging the spindle drive in relation to the cutout in the support structure of the car frame, wherein the housing of the spindle drive is positioned in the first position in relation to the cutout so that the fastening flange of the housing exposes the cutout; (ii) guiding the spindle drive through the cutout in the direction of the vertical axis; (iii) rotating the housing into the second position so that the fastening flange projects beyond the outer edge of the cutout; and (iv) fastening the housing to the support structure by the fastening flange.

In step (ii), the fastening flange can be brought, for example, from a position below the cutout to a position above the cutout.

In an additional step, the spindle can be mechanically coupled to the first car, for example by fastening a spindle nut located on the spindle to the first car, for example to its floor frame. This step can be carried out before or after step (iv), but after step (ii).

A corresponding method for removing the spindle drive from the car arrangement may include, for example, the following steps: (v) releasing the housing from the support structure; (vi) rotating the housing back into the first position; (vii) guiding the spindle drive through the cutout in the direction of the vertical axis to remove the spindle drive.

Guiding the spindle drive in step (vii) can take place in a direction opposite the direction in step (ii).

In this way, the (dis) mounting of the spindle drive can be significantly simplified compared to conventional methods.

Features of the method can also be understood as features of the car arrangement described above and below, and vice versa.

Without restricting the scope of the invention in any way, embodiments of the invention may be considered to be based on the concepts and findings described below.

According to one embodiment, the support structure can form a floor of the car frame. In other words, in the operational state of the double-decker elevator, the first and second car can be arranged in the car frame above the floor, i.e. the support structure. This makes it possible to introduce the spindle drive into the support structure from below.

According to one embodiment, the first car can be arranged below the second car in the operational state of the double-decker elevator. This improves the accessibility of the first car and/or the spindle drive coupled to it from below the car arrangement in the elevator shaft, for example for maintenance and/or servicing purposes.

According to one embodiment, the fastening flange can project beyond the outer edge of the cutout on mutually opposite sides of the cutout in the second position. This means that the fastening flange can be supported on the support structure on both sides. This improves the support of the spindle drive on the support structure.

According to one embodiment, the fastening flange can be fastened to the support structure by a damping element. The damping element can be arranged at least partially between the fastening flange and the support structure. In addition, the damping element can at least partially surround the housing. The damping element can be made at least partially from a particularly vibration-damping material, such as an elastomer or another suitable plastic, such as polyurethane. This means that the transmission of unwanted vibrations between the support structure and the spindle drive during operation of the double-decker elevator can be avoided or greatly diminished.

According to one embodiment, the fastening flange and the damping element can be screwed together. Additionally or alternatively, the damping element and the support structure can be screwed together. The (dis) mounting of the spindle drive can thus be further simplified.

According to one embodiment, the damping element can be divided into at least two individual parts that can be mounted and/or dismounted separately from one another. If the damping element is realized as a layer stack consisting of a plurality of layers (see below), the damping element can, for example, be divided into the individual parts transversely to the stacking direction of the layer stack. This simplifies the (dis) mounting of the damping element. For example, it is thus possible to avoid having to dismount other components of the car arrangement in order to (dis) mount the damping element.

According to one embodiment, the damping element can be constructed from at least two layers lying one above the other. The layers can differ from each other in terms of their materials. In other words, the damping element can be realized as a layer stack consisting of a plurality of layers stacked on top of each other in a stacking direction. The layers can be connected to each other in a suitable manner, i.e. in a force-locking, positive-locking and/or materially bonded manner. For example, one of the layers can be a carrier layer made of a comparatively strong material such as metal and the other layer can be a damping layer made of a comparatively vibration-damping material such as plastic. This means that the vibration-damping properties of the damping element can be specifically adapted without impairing its strength.

According to one embodiment, the damping element can be constructed from two outer layers and at least one intermediate layer arranged between the two outer layers. The material of the intermediate layer can differ from that of the outer layers. For example, each outer layer can be made of a comparatively strong material such as metal, whereas the intermediate layer can be made of a comparatively vibration-damping material such as plastic. This allows the intermediate layer to be stabilized on both sides and/or protected from mechanical damage. For example, the outer layers can protect the intermediate layer from direct contact with the fastening flange and/or the support structure when the spindle drive is mounted.

According to one embodiment, the intermediate layer can be a plastics layer, such as an elastomer or polyurethane layer. Additionally or alternatively, the outer layers can be metal layers. This allows a particularly low-maintenance damping element that can also be provided at relatively low cost.

According to one embodiment, the first car can be displaceable along the car frame in the direction of the vertical axis by means of two spindle drives. Each spindle drive can comprise a spindle, which is mechanically coupled to the first car, and a drive unit for driving the spindle. The spindle drives can be guided through different cutouts in the support structure. Each drive unit can have a housing that has a fastening flange and can be positioned in the first position and the second position in relation to the corresponding cutout. The two spindle drives can, for example, be of identical design and/or can be (dis) mountable in the same or a similar way, as described above and below using the example of the (single) spindle drive. It is possible for the spindle drives to be mounted diagonally opposite each other on the car frame. This means that the car can be reliably adjusted vertically even under high loads. In addition, the use of two spindle drives can reduce the risk of the car tilting when moving along the car frame.

It is possible for the second car also to be displaceable along the car frame in the direction of the vertical axis by means of one or more spindle drives. The spindle drive or spindle drives can be designed in the same way as the spindle drive of the first car.

It is conceivable, for example, for the first and the second car to be displaceable along the car frame by means of the same spindle drive or the same spindle drives. This makes it possible to displace the cars simultaneously without changing a vertical distance between them.

Alternatively, the first and the second car can be displaceable along the car frame by means of different spindle drives. This makes it possible to displace the cars independently of each other.

According to one embodiment, the second car can be fixed in the car frame in the direction of the vertical axis. The fact that only one of the cars can be displaced means that the dead weight of the car arrangement can be kept low. In addition, the manufacturing and assembly costs can be reduced in this way.

According to one embodiment, the housing can be fastened to the support structure in the second position by the fastening flange. This ensures that the housing does not slip vertically during operation of the double-decker elevator, even if the screw connection of the fastening flange should come loose for unforeseen reasons.

Advantageous embodiments of the invention will be described below with reference to the accompanying drawings, wherein neither the drawings nor the description are intended to be interpreted as limiting the invention.

The drawings are merely schematic, and not to scale. Like reference signs refer to like or analogous features in the different drawings.

DETAILED DESCRIPTION

Figure 1:
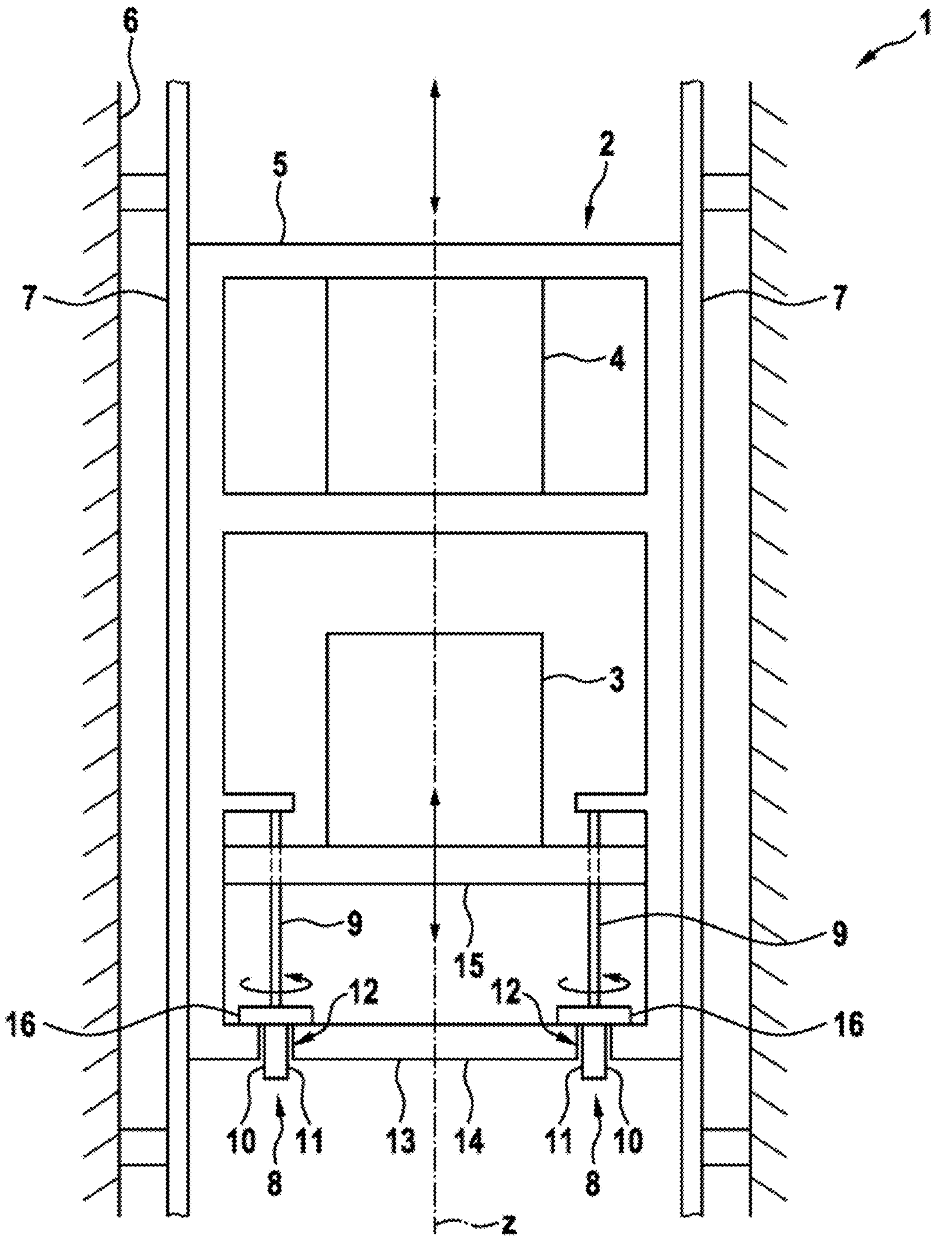
FIG. 1 shows a double-decker elevator according to one embodiment of the invention.

FIG. 1 shows a double-decker elevator 1 in an operational state. The double-decker elevator 1 comprises a car arrangement 2 consisting of a first car 3, a second car 4 and a car frame 5.

In an elevator shaft 6 of the double-decker elevator 1, vertically running guide rails 7 can be anchored, between which the car frame 5 can be mounted so as to be displaceable in the direction of a vertical axis z, hereinafter referred to as the z-direction for short, i.e. in the longitudinal direction of the elevator shaft 6.

The two cars 3, 4 are arranged one above the other in the car frame 5. In this example, the first car 3 is located below the second car 4. However, it is also possible to reverse the arrangement of the two cars 3, 4 in the car frame 5.

By moving the car frame 5 in the elevator shaft 6 along the guide rails 7, the two cars 3, 4 can be moved together and thus stop simultaneously at two floors that are adjacent, i.e. directly above one another.

Floor heights can vary within a building. For example, a vertical distance between two adjacent floors can decrease as the height of a building increases, which can be the case with high-rise buildings in particular. It should therefore be possible to adjust a vertical distance between the two cars 3, 4 within the car frame 5 accordingly.

For this purpose, at least one of the cars 3, 4, here by way of example the first, lower car 3, is mounted in the car frame 5 so as to be displaceable in the z-direction.

The second car 4, on the other hand, can be firmly connected to the car frame 5, i.e. fixed to the car frame 5 in the z-direction.

The vertical adjustment of the first car 3 can take place, for example, by means of two (identical) spindle drives 8, each of which comprises a spindle 9 and a drive unit 10 for driving, i.e. motor-driven rotation of, the spindle 9.

Each drive unit 10 comprises a housing 11 in which, for example, an electric drive motor and optionally a gearbox coupling the drive motor to the corresponding spindle 9 can be arranged.

Each spindle drive 8 is guided through a specially provided cutout 12 in a support structure 13 of the car frame 5.

In this example, the support structure 13 forms a floor 14 of the car frame 5, i.e. both cars 3, 4 are located above the support structure 13. This means that the first car 3 is mounted in a longitudinal section of the car frame 5 located between the support structure 13 and the second car 4 so as to be displaceable in the z-direction.

The spindles 9 can also each be guided through a floor frame 15 of the first car 3. For example, a spindle nut (not shown) fastened to and/or in the floor frame 15 can sit on each spindle 9.

Each housing 11 also has a fastening flange 16, via which the housing 11, and thus the corresponding spindle drive 8, is fastened to the support structure 13.

For example, the housings 11 can be mounted suspended in the corresponding cutout 12, wherein the fastening flanges 16 can rest on an upper side of the support structure 13 facing the floor frame 15.

As can be seen in FIG. 1, the spindle 9 and the drive unit 10 of the same spindle drive 8 can have a common longitudinal axis, wherein the spindle 9 can extend upward in the z-direction from the drive unit 10 toward the first car 3. At its free end, the spindle 9 can be rotatably mounted in a corresponding spindle bearing of the car frame 5.

By rotating the spindle 9 in the corresponding spindle nut (not shown) by means of the corresponding drive unit 10, depending on the direction of rotation, a vertical distance between the support structure 13 and the floor frame 15 is either shortened or lengthened, i.e. the first car 3 is either moved toward or away from the second car 4 (which is fixed in the car frame 5).

In order to simplify the (dis) mounting of the spindle drives 8, for example for maintenance or servicing purposes, each fastening flange 16 can be oriented in two different positions relative to the corresponding cutout 12 by rotating the corresponding housing 11 about its longitudinal axis accordingly.

Figure 2:
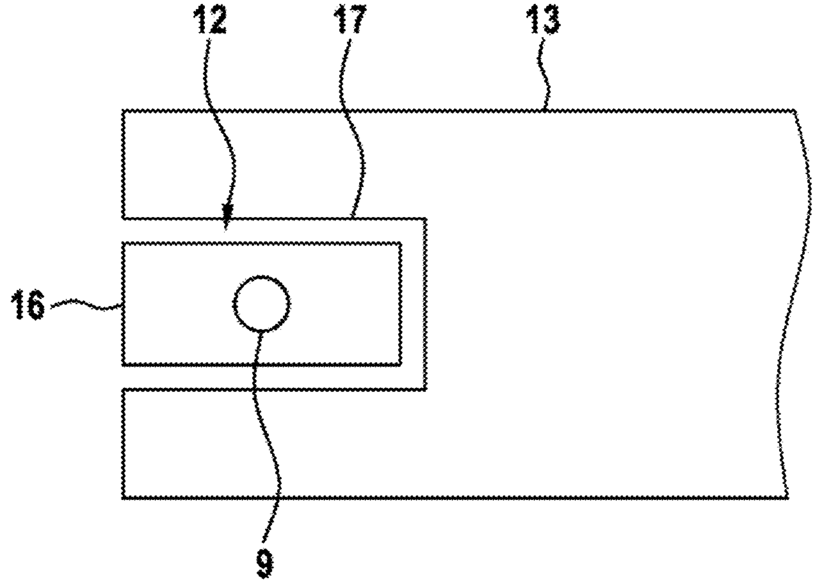
FIG. 2 shows a top view of a section of a support structure of a car arrangement according to one embodiment of the invention during the (dis) mounting of a spindle drive.

FIG. 2 shows a (dis) mounting position of the fastening flange 16, in which the fastening flange 16 can be guided through the cutout 12 unhindered in the z-direction. The cutout 12 is large enough to allow not only the fastening flange 16 but also the rest of the spindle drive 8, i.e. the spindle 9 and the drive unit 10 with its housing 11, to be guided through the cutout 12 in the z-direction in the (dis) mounting position.

Figure 3:
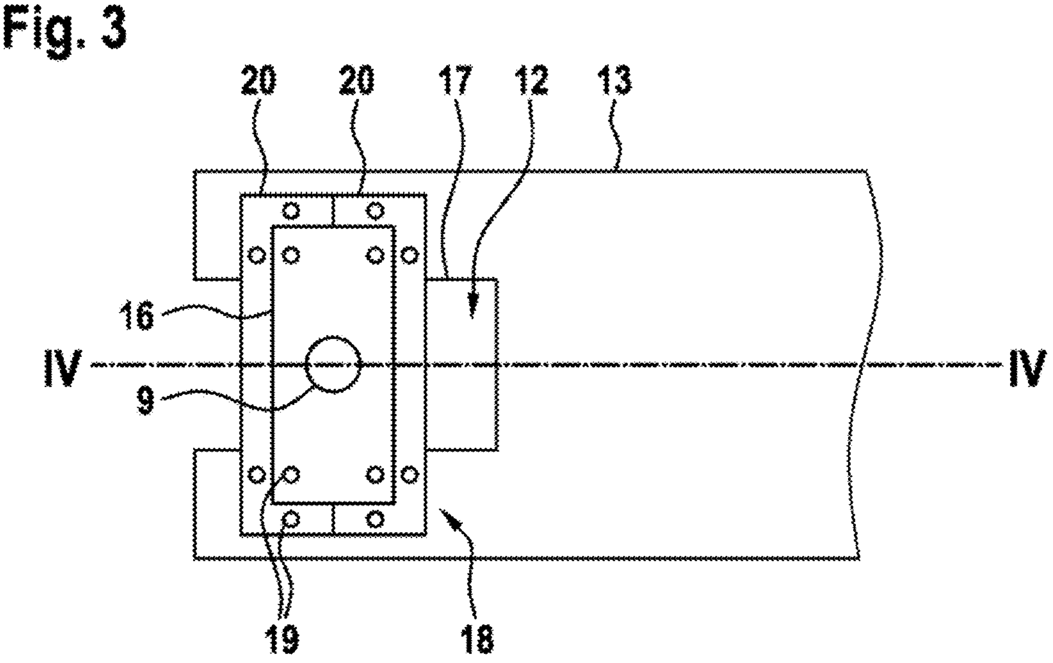
FIG. 3 shows a top view of the section of the support structure with the spindle drive mounted.

FIG. 3 shows a fastening position of the fastening flange 16, into which the fastening flange 16 can be brought, for example, by rotating the housing 11 (not shown in FIG. 3), to which the fastening flange 16 is attached, by 90 degrees about its longitudinal axis starting from the (dis) mounting position.

In the fastening position, the fastening flange 16 partially projects beyond an outer edge 17 of the cutout 12. This prevents the spindle drive 8 from being guided through the cutout 12 in the z-direction-away from the observer in the view shown in FIG. 3.

For example, the fastening flange 16 can project beyond the outer edge 17 on both sides, which improves the support of the spindle drive 8 on the support structure 13.

The fastening flange 16 can be fastened to the support structure 13 directly or optionally by a vibration-damping damping element 18. The damping element 18 can be arranged between the fastening flange 16 and the support structure 13, as can be seen in FIG. 4.

For example, the fastening flange 16 can be screwed to the damping element 18 with a plurality of screws 19, while the damping element 18 can in turn be screwed to the support structure 13 with a plurality of screws 19.

It is possible that the damping element 18 is composed of two or more than two individual parts 20. The individual parts 20 can be (dis) mountable separately from one another. For example, the individual parts 20 can at least partially enclose the drive unit 10 and/or the housing 11 in the mounted state.

Figure 4:
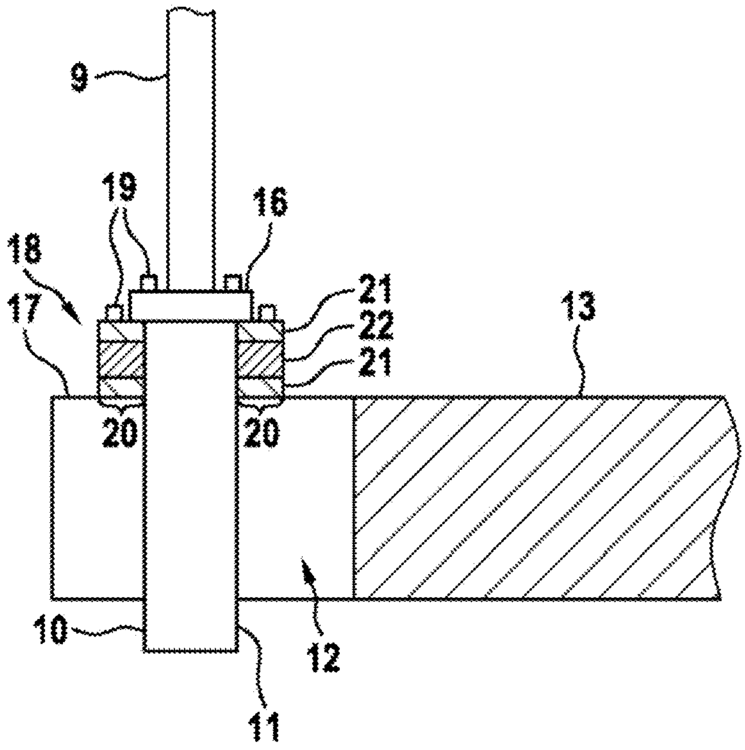
FIG. 4 shows a cross-sectional view of the support structure from FIG. 3 along a section line IV-IV.

As shown in FIG. 4, the damping element 18 can be constructed from a plurality of layers 21, 22 of different materials lying one above the other, in this case from two stabilizing, metallic outer layers 21 and a vibration-damping plastics layer lying between the two outer layers 21 as an intermediate layer 22. One of the outer layers 21 can lie against the fastening flange 16 and the other outer layer 21 against the support structure 13.

A method for mounting a spindle drive 8 in the car arrangement 2 is described by way of example below.

First, the spindle drive 8 is arranged in relation to the cutout 12 in such a way that the fastening flange 16 of the housing 11 is oriented in the (dis) mounting position in relation to the cutout 12.

The spindle drive 8 can then be lifted in the z-direction using a suitable lifting device, such as a crane, and guided through the cutout 12 from below until the fastening flange 16 lies above the cutout 12.

Next, the housing 11 is rotated into the fastening position.

The individual parts 20 of the damping element 18 are now positioned on the support structure 13 and screwed to it, but without fully tightening the relevant screws 19.

The spindle drive 8 is then lowered again until the fastening flange 16 rests flat on the damping element 18.

The fastening flange 16 is then screwed to the damping element 18, but without fully tightening the relevant screws 19.

The spindle drive 8 can now also be oriented.

Only after the spindle drive 8 has been correctly oriented are the screws 19 fully tightened.

The spindle drive 8 can correspondingly be dismounted in the reverse order.

Finally, it should be noted that terms such as "having," "comprising," etc. do not exclude other elements or steps, and indefinite articles such as "a" or "an" do not exclude a plurality. Furthermore, it is noted that features or steps described with reference to one of the preceding embodiments can also be used in combination with features or steps described with reference to other of the above embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A car arrangement for a double-decker elevator, the car arrangement comprising:

a first car;

a second car;

a car frame adapted to be arranged in an elevator shaft of the double-decker elevator and displaceable in a longitudinal direction of the elevator shaft;

wherein the first car and the second car are arranged one above the other in the car frame in an operational state of the double-decker elevator;

wherein the first car is displaceable along the car frame in a direction of a vertical axis by a spindle drive;

wherein the spindle drive includes a spindle mechanically coupled to the first car and a drive unit driving the spindle;

wherein the drive unit has a housing with a fastening flange adapted to fasten the housing to the support structure;

wherein a cutout is provided in the support structure in form of a continuous opening in the support structure that connects an upper side to a lower side of the support structure, therefore allowing the fastening flange to be guided through the cutout unhindered;

wherein the housing is rotatable together with the fastening flange about its longitudinal axis between a first angular position in relation to the cutout and a second angular position in relation to the cutout; and when the housing is in the first angular position the fastening flange exposes the cutout so that the spindle drive can be guided through the cutout in the direction of the vertical axis, and when the housing is in the second angular position the fastening flange projects beyond an outer edge of the cutout and is configured to be fastened in that second angular position to the support structure of the car frame.

2. The car arrangement according to claim 1 wherein the support structure forms a floor of the car frame.

3. The car arrangement according to claim 1 wherein the first car is arranged below the second car in the car frame.

4. The car arrangement according to claim 1 wherein the fastening flange projects beyond the outer edge of the cutout on mutually opposite sides of the cutout when the housing is in the second angular position.

5. The car arrangement according to claim 1 wherein the fastening flange fastens to the support structure by a damping element.

6. The car arrangement according to claim 5 wherein the fastening flange and the damping element are screwed together, and/or the damping element and the support structure are screwed together.

7. The car arrangement according to claim 5 wherein the damping element is divided into at least two individual parts that are adapted to be mounted and/or dismounted separately from one another.

8. The car arrangement according to claim 5 wherein the damping element is formed from at least two layers lying one above the other, the layers being of different materials.

9. The car arrangement according to claim 8 wherein the at least two layers include two outer layers and at least one intermediate layer arranged between the two outer layers, wherein a material of the intermediate layer differs from a material of each of the outer layers.

10. The car arrangement according to claim 9 wherein the intermediate layer material is a plastics material and/or wherein the outer layers material is a metal material.

11. The car arrangement according to claim 1 including: wherein the first car is displaceable along the car frame in the direction of the vertical axis by the spindle drive and another of the spindle drive; wherein a spindle of the another spindle drive is mechanically coupled to the first car; and wherein the another spindle drive is guided through another cutout in the support structure, and a drive unit of the another spindle drive has a housing with a fastening flange positionable in the first angular position and the second angular position in relation to the another cutout.

12. The car arrangement according to claim 1 wherein the second car is fixed in the car frame in the direction of the vertical axis.

13. A double-decker elevator comprising: an elevator shaft; and the car arrangement according to claim 1 wherein the car frame of the car arrangement is displaceable in the longitudinal direction of the elevator shaft.

14. A method for mounting a spindle drive in the car arrangement according to claim 1, the method comprising the steps of:

arranging the spindle drive in relation to the cutout in the support structure of the car frame wherein the housing of the spindle drive is in the first angular position in relation to the cutout so that the fastening flange of the housing exposes the cutout;

guiding the spindle drive through the cutout in the direction of the vertical axis; rotating the housing into the second angular position so that the fastening flange projects beyond the outer edge of the cutout; and fastening the housing to the support structure by the fastening flange.

* * * * *